(12) United States Patent
Perraud et al.

(10) Patent No.: US 11,778,506 B2
(45) Date of Patent: Oct. 3, 2023

(54) METHOD FOR REALLOCATING A DATA PROCESSING PERIPHERAL SERVER

(71) Applicants: Renault s.a.s., Boulogne-Billancourt (FR); NISSAN MOTOR CO., LTD., Yokohama (JP)

(72) Inventors: Eric Perraud, Plaisance du Touch (FR); Stefania Sesia, Roquefort les pins (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 275 days.

(21) Appl. No.: 17/277,050

(22) PCT Filed: Jun. 24, 2019

(86) PCT No.: PCT/EP2019/066690
§ 371 (c)(1),
(2) Date: Mar. 17, 2021

(87) PCT Pub. No.: WO2020/057787
PCT Pub. Date: Mar. 26, 2020

(65) Prior Publication Data
US 2021/0377782 A1 Dec. 2, 2021

(30) Foreign Application Priority Data
Sep. 20, 2018 (FR) ..................................... 18 71065

(51) Int. Cl.
*H04W 28/02* (2009.01)
*H04W 76/22* (2018.01)
(Continued)

(52) U.S. Cl.
CPC ....... *H04W 28/0268* (2013.01); *H04L 67/101* (2013.01); *H04W 28/0284* (2013.01); *H04W 76/22* (2018.02); *H04W 88/182* (2013.01)

(58) Field of Classification Search
CPC ............. H04W 28/02; H04W 28/0268; H04W 28/0284; H04W 76/22; H04W 88/182; H04L 67/101
See application file for complete search history.

(56) References Cited

U.S. PATENT DOCUMENTS

| 8,244,874 B1 | 8/2012 | Thireault |
| 2013/0080626 A1 | 3/2013 | Thireault |

(Continued)

FOREIGN PATENT DOCUMENTS

| EP | 3923138 A1 * | 12/2021 | ........... G06F 9/5027 |
| EP | 3854136 B1 * | 8/2022 | ......... H04L 67/1004 |

(Continued)

OTHER PUBLICATIONS

International Preliminary Report on Patentability and Written Opinion dated Jul. 18, 2019 in PCT/EP2019/066690, citing documents AA and AB therein, 16 pages.

*Primary Examiner* — Kevin D Mew
(74) *Attorney, Agent, or Firm* — Oblon, McClelland, Maier & Neustadt, L.L.P.

(57) ABSTRACT

A method for reallocating a data processing peripheral server in an MEC architecture includes: a prior step of allocating a current peripheral server to process data for a mobile device, by a management unit, selecting a new peripheral server by the management unit, and notifying peripheral server reallocation to the current peripheral server by the management unit. The selecting is preceded by receiving, by the management unit, of a message dispatched by the mobile device and including a data item representa- (Continued)

tive of a quality of service measured at the level of the mobile device.

9 Claims, 2 Drawing Sheets

(51) Int. Cl.
    *H04L 67/101*     (2022.01)
    *H04W 88/18*     (2009.01)

(56) References Cited

U.S. PATENT DOCUMENTS

| | | | |
|---|---|---|---|
| 2013/0095806 A1* | 4/2013 | Salkintzis | H04W 8/245 455/414.3 |
| 2013/0159498 A1* | 6/2013 | Funge | H04N 21/44218 709/224 |
| 2013/0311551 A1 | 11/2013 | Thibeault | |
| 2014/0362713 A1* | 12/2014 | Agarwal | H04W 24/08 370/332 |
| 2017/0111926 A1* | 4/2017 | Madan | H04W 72/542 |
| 2017/0220394 A1 | 8/2017 | Shim et al. | |
| 2019/0261260 A1* | 8/2019 | Dao | H04W 40/20 |
| 2020/0374740 A1* | 11/2020 | So | H04L 67/34 |
| 2021/0168655 A1* | 6/2021 | Jung | H04L 5/0055 |
| 2022/0014963 A1* | 1/2022 | Yeh | G06N 3/0445 |
| 2022/0286898 A1* | 9/2022 | Zhu | H04W 28/0247 |

FOREIGN PATENT DOCUMENTS

| | | | | |
|---|---|---|---|---|
| WO | WO-2005101782 A1 * | 10/2005 | | H04L 63/02 |
| WO | WO-2016137463 A1 * | 9/2016 | | G06F 1/3212 |
| WO | WO-2019029831 A1 * | 2/2019 | | |

* cited by examiner

METHOD FOR REALLOCATING A DATA PROCESSING PERIPHERAL SERVER

BACKGROUND

The present invention generally relates to the fields of telecommunications and computing and more specifically relates to a method for reallocating a data processing peripheral server in an MEC (Mobile Edge Computing) architecture.

The MEC architecture, as defined in the ETSI GS MEC 003 ("European Telecommunications Standards Institute—Group Specification—Mobile Edge Computing") specification, allows some computations performed in a mobile terminal to be transferred to distributed servers that are located in a limited geographical area around the position of the mobile terminal and/or are centralized in the MEC architecture. This allows, in particular for mobile devices on board a connected vehicle, advantage to be taken of the very high computing power available in these servers but not in the computer of the vehicle, some equipment to be pooled between connected vehicles, the energy and thermal dissipation design constraints to be reduced, and the carbon footprint of such a connected vehicle to be reduced. These computations relate to, for example, high definition mapping of the road, which is enhanced with real-time events and which can be shared between connected vehicles, as well as to the establishment of a virtual horizon, also called electronic horizon, for a vehicle, i.e. of the objects or events arriving in the near future but that are not immediately accessible by the sensors on board the vehicle.

The use of this architecture is hampered by the problem of selecting the most suitable server for providing the requested quality of service, in particular for a moving vehicle. The standard defines procedures for changing over a server for processing the data of a mobile terminal when it performs a "hand-over" or inter-cellular transfer in connected mode, in order to use the server closest to the mobile terminal and therefore to reduce the data transfer time between the server and the mobile terminal. However, these procedures do not enable an end-to-end quality of service to be guaranteed that allows data to be processed within the time slot required by the mobile terminal, in particular when it involves a mobile device on board a connected vehicle with high mobility and high real-time requirements.

BRIEF SUMMARY

One of the aims of the invention is to overcome at least some of the disadvantages of the prior art by providing a method for reallocating a data processing peripheral server in such an architecture, which prevents a detrimental degradation of the quality of service for a mobile device, for example, a mobile device on board a connected vehicle, irrespective of the source of this degradation.

To this end, the invention proposes a method for reallocating a data processing peripheral server in an MEC architecture, comprising:
  a prior step of allocating, by a management unit, a current peripheral server for processing data for a mobile device;
  a step of selecting, by said management unit, a new peripheral server; and
  a step of notifying, by said management unit, of peripheral server reallocation to said current peripheral server, said reallocation method being characterized in that said selection step is preceded by a step of receiving, by said management unit, a message sent by said mobile device and comprising a data item representing a quality of service measured on said mobile device. Said method is mainly implemented in the management unit.

By virtue of the invention, the quality of service of the transferred data processing performed for the mobile device is not only processed by the various servers of the MEC architecture, since the mobile device is simply active with respect to the management of its quality of service by sending a message to the management unit in the MEC architecture. The management unit is implemented, for example, on the MEO ("Mobile Edge Orchestrator") defined by the standard, which is implemented in a server or is distributed over a plurality of servers. The invention challenges the philosophy of the MEC architecture, which aims to adapt itself to the changes of context of the mobile device in a transparent manner for said device, without necessarily denaturing said device: the sending of the message by the mobile device does not require that it knows its data processing server and nevertheless allows stricter compliance with the quality of service required on the mobile device.

According to an advantageous feature of the method according to the invention, said measured quality of service represents the time interval between the instant at which a data processing request is sent by the mobile device to the current peripheral server and the instant at which the mobile device receives the results of said data processing.

This feature allows the perceived quality of service on the mobile device to be taken into account and not only the quality of the network connection, for example.

According to another advantageous feature of the invention, said selection step is preceded by a step of comparing said measured quality of service with a quality of service threshold, said selection step being triggered as soon as said measured quality of service reaches said quality of service threshold. This feature allows a strategy to be implemented that guarantees a minimum quality of service level for the mobile device. According to yet another advantageous feature of the invention, during said selection step said management unit selects said new peripheral server as being that with a quality of service that is estimated as being better than said measured quality of service in a list of peripheral servers other than the current peripheral server, said peripheral servers being:
  able to process said data of the mobile device;
  connected to the current base station of the mobile device or to base stations neighboring said current base station; and
  benefiting from the RNIS (Radio Network Information Service) service,
  said estimated quality of service having been estimated using a deterministic or predictive model.

Thus, maintaining a minimum quality of service can be guaranteed.

Advantageously, the peripheral servers of said list are also interfaced with the LS ("Location Service") and with the BWMS ("BandWidth Management Service"), supplementing the RNIS service. This grants greater flexibility in implementing the method by multiplying the information sources.

According to yet another advantageous feature of the invention, said selection step is preceded by a step of preselecting a plurality of peripheral servers, during which step said management unit sends a request to each of said preselected peripheral servers and in response receives an a priori estimation of the quality of service relating to the connection of each of said preselected peripheral servers with said mobile device. This preselection allows significant degradation of the quality of service to be avoided when changing over the peripheral server processing the data of the mobile device, by anticipating the peripheral server reallocation/reselection requirement. Furthermore, this preselection step allows the estimation of the quality of service of the connection to the preselected peripheral servers to be updated.

According to yet another advantageous feature of the invention, said selection step is preceded by a step of preselecting a plurality of peripheral servers and by steps of instantiating an application for said mobile device in the preselected peripheral servers.

This preselection and this preinstantiation also allows the reallocation requirement to be anticipated and allows it to be accelerated to avoid losing quality of service.

According to yet another advantageous feature of the invention, during said preselection step, said management unit sends a request to each of said preselected peripheral servers and in response receives an estimation of the quality of service relating to the application instantiated for each of said preselected peripheral servers.

This feature allows the real applicative quality of service to be known that is associated with the preselected peripheral servers.

According to yet another advantageous feature of the invention, during said selection step, the management unit takes into account a scheduled itinerary for the mobile device and an estimated speed of said mobile device over said itinerary.

This feature allows the number of reallocations to be limited and therefore saves on network and computation resources.

The invention also relates to a mobile device able to send a message comprising a measured quality of service to a management unit implementing the method according to the invention. The mobile device is, for example, a hardware module and communication software on board a connected vehicle. The communication module is, for example, provided with a 4G or 5G chip (with G denoting the mobile telephony technology generation).

Advantageously, the mobile device according to the invention is able to intermittently send a message comprising a measured quality of service to said management unit. This allows said management unit to monitor the quality of service rendered to the mobile device and allows statistics to be determined or allows a predictive model to be run on said quality of service.

More advantageously, the mobile device comprises means able to trigger the sending of said message when said measured quality of service is within a quality of service threshold that must not be exceeded and a value located 20% before said measured quality of service threshold that must not be exceeded. Thus, the management unit can anticipate the reallocation of a peripheral server for processing the data of the mobile device. It is to be noted that the value located 20% before the quality of service threshold not to be exceeded is less than 20% of said threshold or greater than 20% of said threshold as a function of the direction of exceedance, i.e. of the definition of the measured quality of service. In particular, if this corresponds to a response time, the measured quality of service must not exceed an upper threshold. However, if the measured quality of service is expressed as the difference between a maximum response time and a measured response time, the measured quality of service must not exceed a lower threshold. Of course, this value of 20% is indicative, a lower value can be used. The mobile device according to the invention has advantages similar to those of the reallocation method according to the invention.

BRIEF DESCRIPTION OF THE DRAWINGS

Further features and advantages will become apparent from reading a preferred embodiment, which is described with reference to the figures, in which.

DETAILED DESCRIPTION

Figure 1:
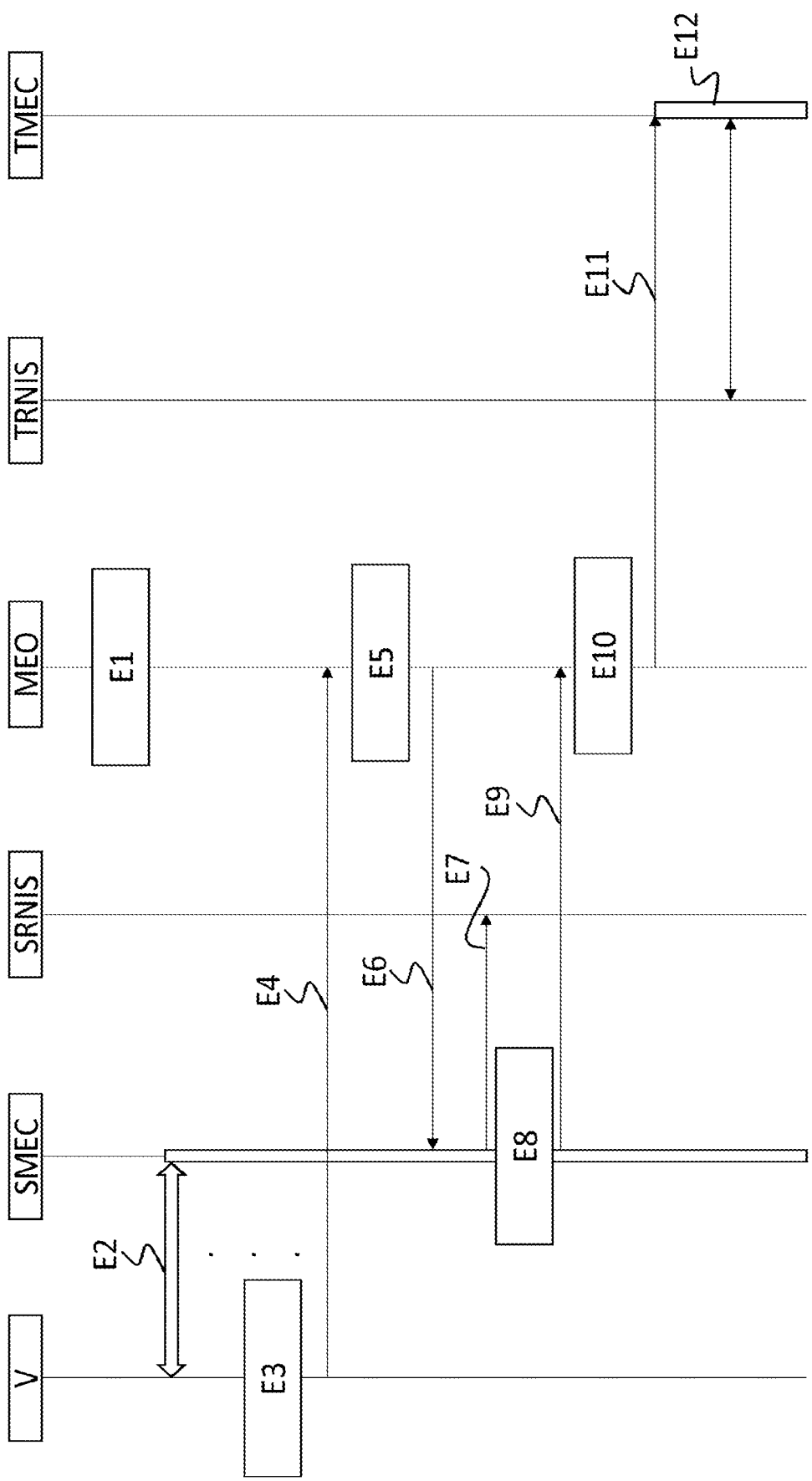
FIG. 1 shows the first steps of the reallocation method according to the invention, in this embodiment according to the invention.
Figure 2:
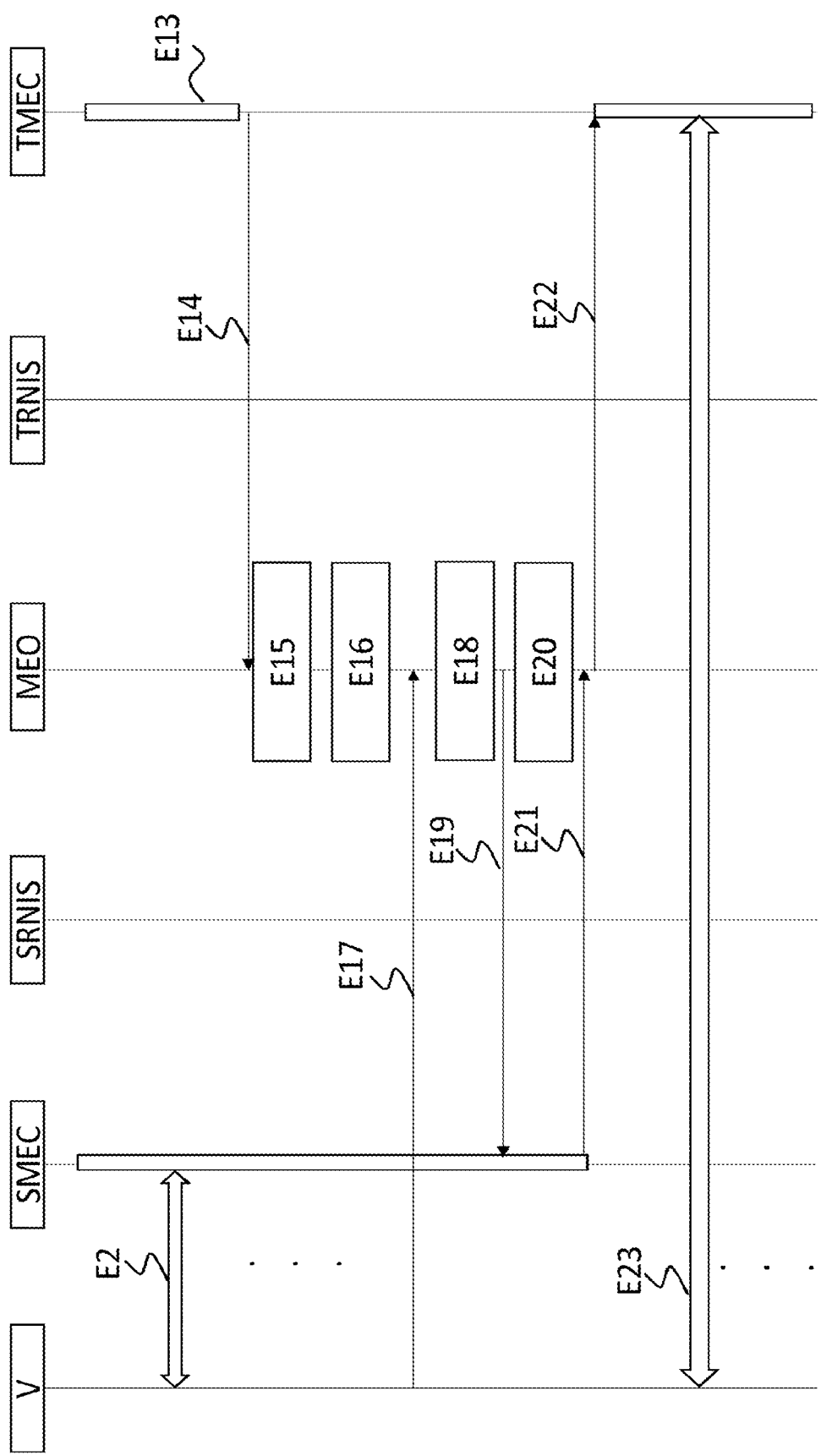
FIG. 2 shows the following steps of the reallocation method according to the invention, in this embodiment according to the invention.

According to a preferred embodiment of the invention, shown in FIGS. 1 and 2, the method for reallocating a peripheral server according to the invention is at least partly implemented in a management unit on the MEO. Some of the described steps are nevertheless performed in a mobile device or in peripheral servers managed by the management unit. By virtue of the invention, the management unit at all times ensures that the peripheral server selected for processing the data of the mobile device on board a vehicle V is suitable for performing the requested service and complies with the requested quality of service.

During a step E1, the mobile device of the vehicle V is registered with the management unit for remote processing of a functionality, for example, in this embodiment of the invention, computing an electronic horizon. For example, the management unit is a proprietary service implemented in one or more servers offering certain remote services for the motor vehicle, such as computing the electronic horizon or high definition mapping. It manages a plurality of peripheral or central servers able to perform the computations required for rendering these services.

During this registration step E1, the mobile device of the vehicle V indicates its position, the service with which it intends to subscribe, in this case therefore the electronic horizon, as well as a target quality of service for performing this service. To this end, the "Register" message of the standard is used, for example.

During this step E1, following the reception of the Register message, the management unit selects a current peripheral server that is suitable, i.e. accessible from the base station to which the mobile device is attached, and is able to provide the electronic horizon service with the target quality of service requested by the mobile device. To this end, the management unit estimates an a priori quality of service that each of the peripheral servers located in the radio zone accessible by the mobile device can provide, by polling these peripheral servers with an "MECResourceQuery" message, for example (the message defined as "QueryAppInstanceInfo" also could be used but involves starting the application on the polled server).

The estimation of this a priori quality of service will be explained in detail hereafter. In order to match a peripheral server with the radio zone accessible by the mobile device, the management unit is interfaced with the RNIS service of the operator to which the mobile device is subscribed. The Get(PLMN_info) message particularly allows the cell identifiers associated with a peripheral server to be known. In order to manage the mobility of the mobile device for inter-operator roaming, the management unit takes into account roaming agreements of the mobile device with operators other than that with which the mobile device is subscribed. Furthermore, the management unit itself is interfaced with a plurality of operator networks and therefore its peripheral servers are also interfaced with a plurality of operator networks.

At the end of step E1, a current peripheral server SMEC able to process the data of the mobile device, so as to provide it with an electronic horizon, is allocated to the mobile device.

Step E2 involves providing the mobile device with the electronic horizon service using the current peripheral server SMEC that instantiated an electronic horizon application for the vehicle V. During this step data is exchanged between the vehicle V and the current peripheral server SMEC:

the vehicle V sends route sections, the precise position of the vehicle, to the current peripheral server SMEC;

the current peripheral server SMEC sends objects and events of interest to the vehicle V arriving in the near future on the route of the vehicle.

The current peripheral server SMEC implements, in this embodiment of the invention, a plurality of elements of the MEC architecture proposed by the ETSI, in particular the applicative instance providing a service to the vehicle V, but also the S-MEPM ("Serving Mobile Edge Platform Manager") management unit of the applicative instances of the current peripheral server SMEC.

Step E3 involves the mobile device measuring the effective quality of service (perceived by the mobile device) for the supplied electronic horizon service. This quality of service includes the time for computing the electronic horizon on the current peripheral server SMEC, but also the transfer time between a request of the mobile device connected to the service and the associated response. This measured quality of service is expressed, for example, as follows:

$$Q_{mes}=Q_{target}-Q_{real},$$

where:

$Q_{target}$ is the target quality of service requested by the mobile device and represents the maximum time tolerated by the mobile device between the instant at which a request associated with the service is sent by the mobile device to the current peripheral server SMEC and the instant at which the mobile device receives the results of the request; and $Q_{real}$ is the real-time interval between the instant at which a request associated with the service is sent by the mobile device to the current peripheral server SMEC and the instant at which the mobile device receives the results of the request.

During this step E3, the mobile device compares the measured quality of service $Q_{mes}$ with a first strictly negative quality of service threshold $Q_1$ (i.e. this threshold is not reached as long as the measured quality of service is better than the target quality of service) and can be associated with the type of supplied service. In this embodiment of the invention, it is assumed that the measured quality of service $Q_{mes}$ in step E3 has fallen below the quality of service threshold $Q_1$, which triggers step E4. This degradation of the quality of service is due, for example:

to a degradation of the quality of service on the radio or at the network core, if excess data is exchanged with the radio or with the current peripheral server SMEC, this excess data moreover can take precedence over the data of the mobile device;

to a movement of the mobile device that departs from the coverage of the current peripheral server SMEC or of the current operator;

to a higher quality of service requirement, in the event that, for example, the vehicle reaches a dangerous area requiring faster display of the electronic horizon; or to a reduction in the resources available in the current peripheral server SMEC, for example, if a priority service monopolizes resources previously allocated to the mobile device.

The following step E4 involves the mobile device sending a message to the management unit that comprises the quality of service $Q_{mes}$ measured in step E3, as well as the location of the mobile device. This location corresponds, for example, to the "Tracking Area" as defined in the 4G standard. As a variant, the measured quality of service does not relate to the target quality of service but corresponds to $Q_{real}$, i.e. the time interval between the instant at which a request associated with the service is sent by the mobile device to the current peripheral server SMEC and the instant at which the mobile device receives the results of the request. In this variant, the message sent in step E4 optionally further comprises a target quality of service requested by the mobile device, in particular when this target quality of service differs from that sent in step E1 to the management unit. This message is sent, for example, over a UDP ("User Datagram Protocol") or TCP ("Transmission Control Protocol") communication protocol or even over https, for example, if the management unit has subscribed to regular measured quality of service notifications by the mobile device. In another variant, the message sent by the mobile device comprises an indication of the fact that the measured quality of service is not as good as the target quality of service, instead of the measured quality of service. In another variant, the message sent in step E4 does not include the location of the mobile device, with the management unit having the possibility of using the network service LS ("Location Service") to obtain this location when the mobile device is already connected to a current peripheral server. This information is nevertheless useful in this message E4 if the connection with the current peripheral server is lost or in the event that network coverage is lost.

The following step E5 involves the management unit finding the degradation of the quality of service using the data received in the message received in step E4. The following steps E6 to E9 allow the management unit to determine whether the degradation of the quality of service is due to a movement of the mobile device.

Step E6 involves the management unit sending a "Get" http message to the current peripheral server SMEC requesting the cause of the degradation of quality of service found in step E5.

Step E7 involves the current peripheral server SMEC using the SRNIS service, which is the RNIS service to which it is connected, via a standardized programming interface. This service allows it to know the radio power measurements relative to the radio connection between the mobile device and its current base station, as well as the radio power measurements between the mobile device and its neighboring base stations. Thus, it determines, during a step E8, whether the degradation of the quality of service observed in step E5 is due to an ongoing hand-over, or to a loss of radio coverage on the current operator of the mobile device, or to another cause.

Step E9 involves the current peripheral server SMEC sending a response to the message received in step E6, indicating whether the degradation of the quality of service found in step E5 is due to a movement of the mobile device or to another cause. In particular, in this step E9 the current peripheral server SMEC indicates, in the response that it sends to the management unit, whether the degradation of the quality of service found in step E5 is due to a hand-over or to a loss of radio coverage.

Step E10 is a step involving the management unit preselecting peripheral servers TMEC other than the current peripheral server SMEC, from a list of peripheral servers managed by the management unit, with this preselection only retaining the peripheral servers:

able to process the data of the mobile device in terms of functionality (in this case the electronic horizon) and in terms of resources; and preferably connected to the LS, RNIS and BWMS ("BandWidth Management Service") network services; and that are accessible:

from the current base station of the mobile device (i.e. to which it is connected) if the cause of degradation of the quality of service received in step E9 is due to a cause other than a movement of the mobile device. This cause is, for example, a change in the requested target quality of service (which can be detected by the management unit, in particular when the target quality of service is contained in the message sent during step E4), or a degradation of the network core connection to the current peripheral server SMEC, or a reduction in the resources on the current peripheral server SMEC; or from the target base station to which the mobile device will be attached if the cause of degradation of the quality of service received in step E9 relates to a hand-over (in this case the current peripheral server SMEC also traces the identity of the target cell to the management unit); or from base stations close to the current cell but managed by an operator other than the current operator, with this other operator having a roaming agreement with the mobile device and with the management unit if the cause of degradation of the quality of service received in step E9 relates to a loss of radio coverage.

In the event that the mobile device is in a hand-over situation, the management unit optionally modifies the target base station to be taken into account for the preselection of a new current peripheral server as a function of a scheduled itinerary for the vehicle and of the estimated speed thereof. For example, this is the case when the management unit does not know the target base station of the radio hand-over.

In order to be able to refine the preselection over these retained peripheral servers so as to only retain those with a quality of service that is better than the target quality of service, and even the measured quality of service, the following steps E11 to E15 are implemented.

Step E11 involves the management unit sending a "Get" http request to each of the peripheral servers TMEC retained in step E10, which request requests, from the relevant peripheral server TMEC, an estimation of the quality of service that said server is able to provide to the electronic horizon service. The quality of service estimation is requested in terms of resources and of connectivity, taking into account a priority given to the electronic horizon application relative to the other applications running on the relevant peripheral server TMEC, with this priority being indicated in the request. The peripheral servers TMEC are, for example, to this end a service for estimating the quality of service registered and authenticated as an available service that can be polled by an authorized remote server.

Step E12 involves each of the peripheral servers TMEC polled in step E11 using the TRNIS service that is the RNIS service to which the relevant peripheral server TMEC is connected, and estimating the a priori quality of service of the connection between the mobile device and the relevant peripheral server TMEC. To this end, the peripheral server TMEC uses the information provided by the TRNIS service, particularly in terms of "Radio Access Bearer", particularly providing the rate and the radio priority that can be allocated between the mobile device and the relevant peripheral server TMEC. The estimation of this quality of service is described hereafter.

Step E13 involves each of the peripheral servers TMEC polled in step E11 instantiating the electronic horizon application for the mobile device and assessing the quality of service associated with the applicative level, in particular in terms of computation response time. As a variant, this assessment is made without instantiating the application, but by estimating memory and computation resources that remain available in the relevant peripheral server TMEC.

The following step E14 involves the management unit receiving responses from the peripheral servers TMEC to the messages sent in step E11. These responses comprise estimations of the quality of service in terms of connectivity and of applicative resources that will be allocated by each of the polled peripheral servers TMEC if they provided the mobile device with the electronic horizon service.

The following step E15 involves the management unit consolidating the estimations received in step E14. More specifically, in this step E15, the management unit estimates the overall quality of service able to be supplied by each of the peripheral servers TMEC polled in step E11. This overall quality of service $Q_{overall}$ is, for example, equal to:

$$Q_{overall} = Q_{target} - Q_{estimated},$$

where $Q_{estimated}$ is a quality of service estimated from a deterministic model or from a predictive model, as described hereafter.

During the following step E16 the management unit classifies these peripheral servers TMEC in ascending order of previously estimated overall quality of service, for each base station identified in step E10 as being relevant for serving the mobile device during a forthcoming change over of a current peripheral server. Then, in this step E16 the management unit preselects, for each identified base station, the peripheral server with the best estimated overall quality of service, with this moreover having to be strictly positive or in any case better than the measured quality of service received in step E4. As a variant, in this step E16 the management unit preselects, for each identified base station, the peripheral server having a strictly positive estimated overall quality of service, but for which the operating cost is less for the mobile device.

The following step E17 involves the management unit receiving a message sent by the mobile device and comprising a new quality of service $Q_{mes}$ measured by the mobile device, as well as the new location of the mobile device. In this example of the use of the invention it is assumed that the measured quality of service has fallen below a second quality of service threshold $Q_2$ that is less than the first quality of service threshold $Q_1$, for example, by 20%. As a variant, the message sent in this step E17 by the mobile device does not include the location of the mobile device, with this being recovered by the interface LS in this variant.

The following step E18, triggered by the management unit due to the fact that the measured quality of service $Q_{mes}$ has fallen below the second quality of service threshold $Q_2$, involves selecting a new peripheral server TMEC for supplying the mobile device with the electronic horizon service. If the cause of this degradation (identified in steps E6 to E9) is only due to a higher quality of service requirement, or to a reduction in the resources available in the current peripheral server SMEC or to a degradation of the quality of the connectivity between the current peripheral server SMEC and the mobile device, the new selected peripheral server TMEC corresponds to the peripheral server TMEC preselected in step E16 for the current base station of the mobile device. If the cause of this degradation (identified in steps E6 to E9) is due to a movement of the mobile device within the same operator, and if there is an ambiguity on the target base station, the management unit awaits notification of the end of the radio hand-over in order to know the identity of the new base station via the SRNIS service. The new selected peripheral server TMEC corresponds to the peripheral server TMEC preselected in step E16 for said new base station of the mobile device.

The following step E19 involves the management unit sending a message to the current peripheral server SMEC notifying it of the end of the execution of the relevant application, via a life-cycle message of an MEC application such as TerminateAppinsRequest. Upon reception of this message, the current peripheral server SMEC prepares to end the electronic horizon application that it instantiated. In the event that the application supplied to the mobile device requires supplying data stored in a buffer memory to the new peripheral server TMEC during this peripheral server reallocation, the current peripheral server SMEC sends this data to the management unit, during a step E21 that runs, for example, at the same time as the following step E20.

Step E20 involves the management unit entering a new rule for routing data sent and received by the mobile device relating to the electronic horizon service. To this end, the management unit uses the standardized NEF ("Network Exposure Function") interface that allows the description of the relevant PFD ("Packet Flow Descriptor") data stream to be associated with a new DNA ("Data Network Access") in the PCF ("Policy Control Function") entity of the 4G to 5G mobile telephone data network that is used. This step allows the mobile device to send and receive data to/from the new peripheral server without having to manage the change over of routing data during the change over of a peripheral server.

The following step E22 involves the management unit sending a message (such as "ChangeAppInstanceStateRequest" with the parameter "ChangedStateTo" set to "Start") to the new peripheral server TMEC asking it to run the electronic horizon service preinstantiated in step E13. This message also contains the data that is optionally received in step E21.

Finally, step E23 involves exchanging data between the mobile device and the new peripheral server TMEC for supplying the electronic horizon service, with this new peripheral server TMEC becoming the current peripheral server of the mobile device.

The estimation of the quality of service that can be supplied by a peripheral server to the mobile device will now be described. For example, it uses a deterministic or predictive model.

The deterministic model uses, for example, the following equation:

$$Q_{estimated} = UL + DL + T_{compute}$$

where:
UL is the number of transactions (or exchanged communications) performed when the mobile device sends a request to the peripheral server, multiplied by an estimated latency time;
DL is the number of transactions performed when the peripheral server sends the result of the request for a message to the mobile device, multiplied by an estimated latency time; and
$T_{compute}$ is an estimation of the computation time required to process a request from the mobile device. This estimation depends on the hardware resources virtualized on the peripheral server and allocated to the electronic horizon application, in particular the allocated storage capacity, the number of allocated virtual processors, their minimum frequency and their types, this information is accessible to the management unit via the "Virtual Compute Descriptor" and "Virtual Storage Descriptor" services; a possible alternative embodiment therefore involves estimating $T_{compute}$ using the management unit as opposed to the reception thereof in step E14.

The estimated latency times correspond to the end-to-end latency times between the mobile device and the peripheral server. Their values are determined on the basis of a quality of service prediction model using statistics relating to the data traffic between the base station of the mobile device and the peripheral server and on radio metrics specific to this base station; the statistics depend on the amount of exchanged data, on the connection types used (real time, "best effort", etc.) and on the number of existing connections.

The predictive model is used to predict the performance of the electronic horizon service on the peripheral server, for which a log already exists on which a machine learning system has been able to be trained, such as a neural network providing an estimated quality of service as output.

When such a log exists and is consistent enough for the learning system to provide reliable results, the predictive model is preferred to the deterministic model for estimating the quality of service supplied to the mobile device by the peripheral server.

It is to be noted that numerous alternative embodiments of the invention are possible, in particular as a function of the operating cases for the method according to the invention.

Furthermore, some steps of the described method are optional or modifiable: as a variant, step E4 directly triggers the reallocation of a peripheral server by the management unit, with the preselection step being continuously performed by the management unit even before a message is received that is sent by the mobile device and that contains a measured quality of service. Steps E6 to E9 are not implemented as a variant, with the management unit being able to detect a movement situation by other means, for example, using the LS service.

Sending a message containing a quality of service measured by the mobile device to the management unit is a periodic variant, in addition to being triggered under certain conditions, one of which can be the passage below a zero quality of service threshold, or even the detection of a radio cell hand-over.

The invention claimed is:
1. A method for reallocating a data processing peripheral server in an MEC architecture, comprising:
a prior step of allocating, by a management unit, a current peripheral server for processing data for a mobile device;

selecting, by said management unit, a new peripheral server; and notifying, by said management unit, a peripheral server reallocation to said current peripheral server, wherein said selecting is preceded by receiving, by said management unit, a message sent by said mobile device and comprising a data item representing a quality of service measured on the mobile device.

2. The reallocation method as claimed in claim 1, wherein said measured quality of service represents the time interval between the instant at which a data processing request is sent by the mobile device to the current peripheral server and the instant at which the mobile device receives the results of said data processing.

3. The reallocation method as claimed in claim 1, wherein said selecting is preceded by comparing said measured quality of service with a quality of service threshold, said selecting being triggered as soon as said measured quality of service reaches said quality of service threshold.

4. The reallocation method as claimed in claim 1, wherein, during said selecting, said management unit selects said new peripheral server as being that with a quality of service that is estimated as being better than said measured quality of service in a list of peripheral servers other than the current peripheral server, said peripheral servers being:
- configured to process said data of the mobile device;
- connected to the current base station of the mobile device or to base stations neighboring said current base station; and benefiting from the RNIS (Radio Network Information Service) service, said estimated quality of service having been estimated using a deterministic or predictive model.

5. The reallocation method as claimed in claim 1, wherein said selecting is preceded by preselecting a plurality of peripheral servers, during which said management unit sends a request to each of said preselected peripheral servers and in response receives an a priori estimation of the quality of service relating to the connection of each of said preselected peripheral servers with said mobile device.

6. The reallocation method as claimed in claim 1, wherein said selecting is preceded by preselecting a plurality of peripheral servers and by instantiating an application for said mobile device in the preselected peripheral servers.

7. The reallocation method as claimed in claim 6, wherein, during said preselecting, said management unit sends a request to each of said preselected peripheral servers and in response receives an estimation of the quality of service relating to the application instantiated in each of said preselected peripheral servers.

8. The reallocation method as claimed in claim 1, wherein, during said selecting, the management unit takes into account a scheduled itinerary for the mobile device and an estimated speed of said mobile device over said itinerary.

9. The reallocation method as claimed in claim 1, wherein said message sent by the mobile device and comprising a measured quality of service also comprises a location data item of said mobile device.

* * * * *